Aug. 24, 1948.

G. Q. DECKER, 3D., ET AL 2,447,566

APPARATUS FOR MEASURING A CONDITION
ON A ROTATING MEMBER

Filed May 31, 1946

INVENTORS
G. Q. Decker
E. C. Capuzzi
BY
ATTORNEY

Aug. 24, 1948.   G. Q. DECKER, 3D., ET AL   2,447,566
APPARATUS FOR MEASURING A CONDITION
ON A ROTATING MEMBER
Filed May 31, 1946   2 Sheets-Sheet 2
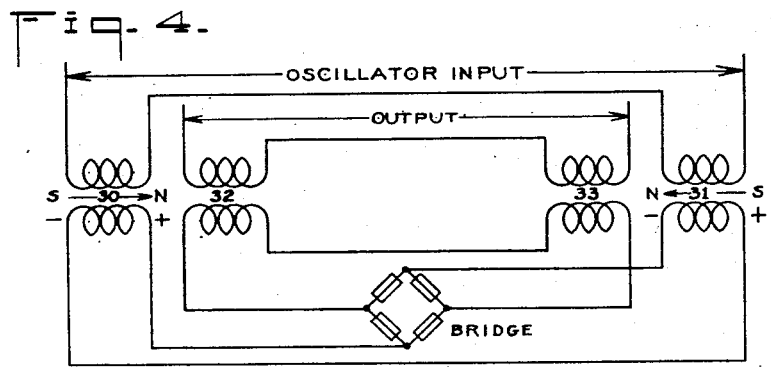
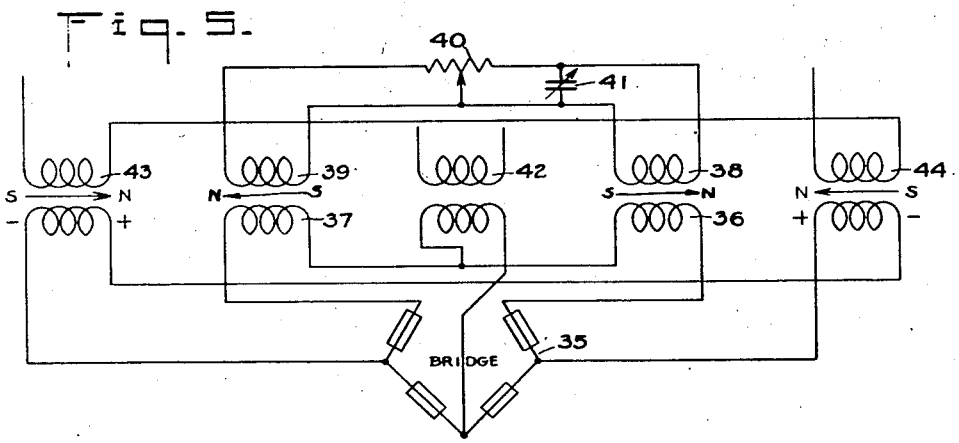
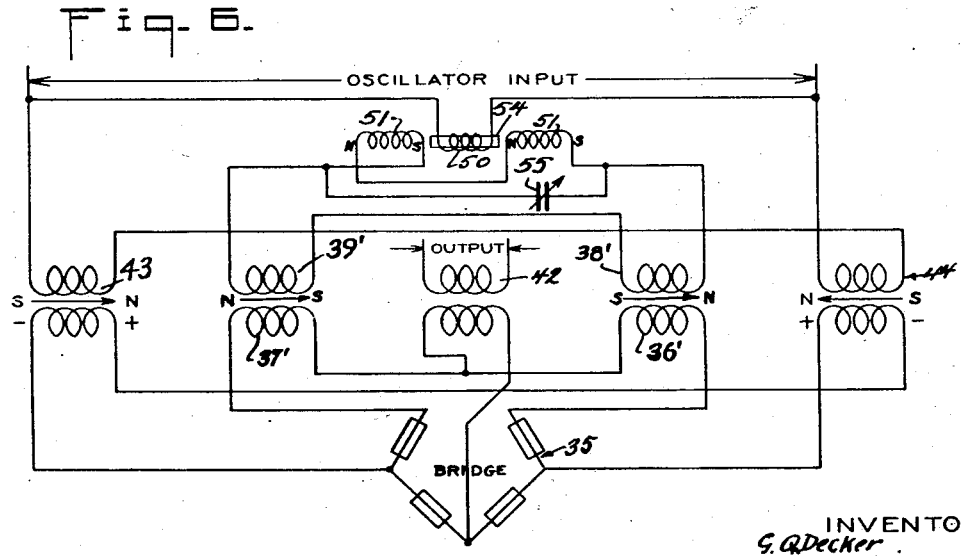
INVENTORS
G. Q. Decker
E. C. Capuggi
BY
ATTORNEY Patented Aug. 24, 1948

2,447,566

UNITED STATES PATENT OFFICE 2,447,566

APPARATUS FOR MEASURING A CONDITION ON A ROTATING MEMBER

Gerard Q. Decker, 3rd, Bradford Hills, and Edmund C. Capuzzi, Philadelphia, Pa., assignors to The Baldwin Locomotive Works, a corporation of Pennsylvania Application May 31, 1946, Serial No. 673,454

12 Claims. (Cl. 323—75)

This invention relates generally to electrical systems involving a magnetic field arrangement for transmitting power to an electrically responsive condition pickup mounted on a rotating member and for transmitting a signal voltage from such pickup through a magnetic field to an external point.

Systems of this general type are particularly useful in torquemeters for measuring torsional strain in shafts although the system is equally applicable to measuring other conditions associated with rotating members such as temperature, fluid, pressure, force, strain in revolving propeller blades, etc. In each instance the condition is measured by a suitable electrical responsive condition pickup of which there are many well-known in the art, although the bonded wire type strain gage is especially well adapted to torquemeters. To transmit power to the pickup, a pair of inductively associated power input windings have been heretofore employed, one being a stator surrounding the rotating shaft and the other a rotor mounted on the shaft for rotation therewith. The transformer action between such a pair of windings served in place of mechanical slip rings and brushes. The output or signal voltage from the condition pickup in response to the occurrence of a condition to be measured has been heretofore similarly transmitted through a pair of inductively associated windings consisting of rotor and stator windings. However, the magnetic field created by such power input windings caused undesired voltages to be induced in the nearby signal transmitting windings and these induced voltages were of such large magnitude compared to the relatively small signal voltages that the latter were completely submerged with the result that measurements of the desired condition could not be made.

Efforts have been made to overcome such overpowering magnetic effects of the power input windings by providing either magnetic shields or bucking coils positioned with the intention of counteracting the adverse influence of the magnetic field. While these devices may be useful for various applications, yet they are deficient or limited in certain respects pertaining particularly to a true null balance, range of linearity, power transfer efficiency, compactness and other possible factors.

It is an object of our invention to provide an electrical measuring apparatus and system of the general type previously referred to that is adapted, in an improved manner, to effectively prevent the magnetic field of the power input windings from inducing an undesired voltage in the condition pickup windings, thereby to obtain a true null balance for either direction of condition response, a large range of linearity between a given condition change and the output voltage, and a high degree of power transfer efficiency.

A further object is to provide an improved apparatus and system as set forth in the foregoing object that is relatively simple in construction, operation and maintenance and has a high degree of compactness as well as flexibility in the disposition of the windings.

In accomplishing the foregoing as well as other objects, we are able to obtain a substantially definitely known zero for reversals of strain, if strain is the condition to be measured as in a torquemeter. Such zero by being common to either direction of strain permits a high degree of linearity for very low readings together with simplicity of adjustments. It is to be understood that reversal of strain may occur in a shaft even though the shaft continues to rotate in only one direction and it is desirable to have a single zero for either direction because such reversals may occur almost instantaneously. If any adjustment would be required in order to accurately measure the reversed strains, it is seen that the value of this apparatus would be largely reduced because of either the inability or the excessive cost to make the adjustments as fast as the reversals occur.

As to power efficiency, we obtain a high degree of useful power by eliminating the usual bucking coil and then creating a bucking function as an inherent part of the power input coils thereby causing the power that was formerly used in a bucking coil to be used entirely as input power. This is accomplished in one particular form of our invention by having the power input windings divided and the divided input portions thereof so spaced relative to each other that one does not interfere with the operation of the other, as a transformer, but at the same time when they are brought reasonably close together for compactness their respective fields oppose each other to provide a neutral region in which the signal or output windings are located. One result of this arrangement is that a maximum permissible signal voltage can be attained without approaching magnetic saturation of the shaft material upon which the condition responsive element is mounted whereas in prior arrangements one limitation of the amount of bridge voltage available was apparently a saturation problem. We believe that in one aspect of our invention, certain of the desirable features are the result of electrical symmetry in the system.

Other objects and advantages will be more apparent to those skilled in the art from the following description of the accompanying drawings in which:

Fig. 4 is a wiring diagram showing how the principles of our invention permit both the input and output windings to be divided with the divided portions of the output windings placed directly under the magnetic influence of the input windings;

Fig. 5 is a wiring diagram showing one means for balancing the pickup bridge by a self-feeding action; and Fig. 6 is a further arrangement showing external power means of balancing the pickup bridge by supplying and controlling in a novel manner an external source of current to the bridge arms.

Figure 1:
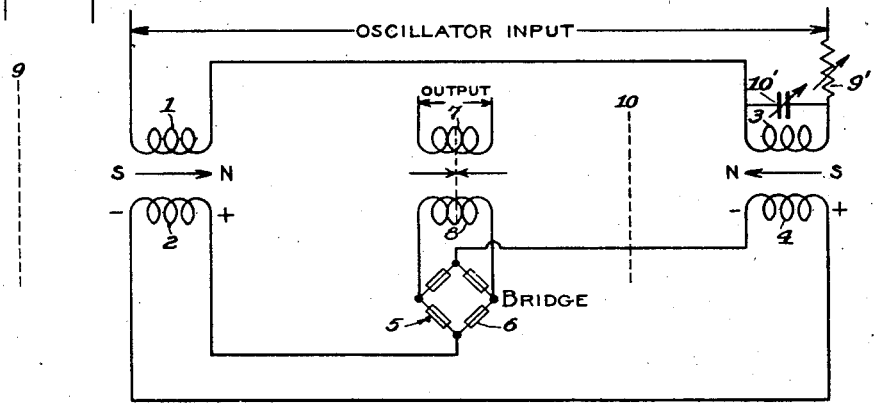
Fig. 1 is a simplified wiring diagram showing divided power input windings and an undivided pair of output windings.
Figure 3:
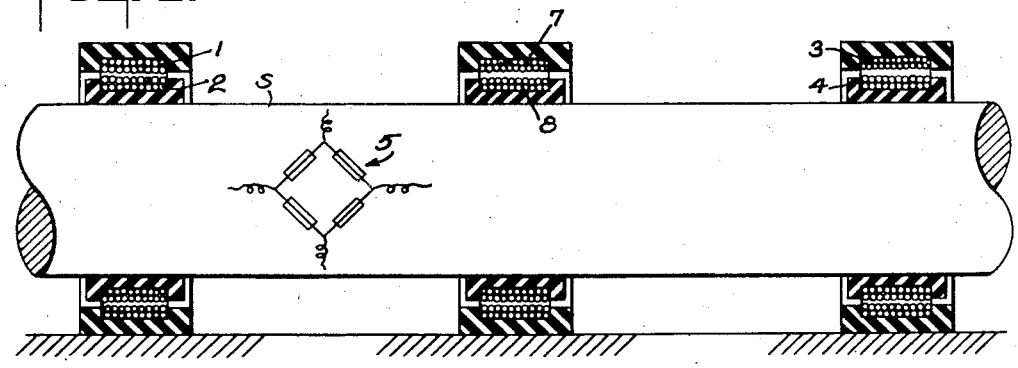
Fig. 3 is a mechanical diagram showing generally the arrangement of inductively associated input and output windings mounted around a rotatable shaft.

To eliminate adverse effects of the magnetic fields in our improved system, we have divided or split the inductively associated power input windings into two sets 1, 2 and 3, 4, as shown specifically in Fig. 1. While this division is equal in Fig. 1, yet any other division might be employed in a manner as later described. The series connected primary windings 1 and 3 constitute stator windings encircling a rotatable shaft S, Fig. 3, while the series connected secondary coils 2 and 4 are rotor windings wound around shaft S for rotation therewith with a suitable minimum air gap between the stator and rotor coils to assure adequate transformer action between the same. The divided primary windings 1 and 3 are preferably connected in series to insure in-phase operation of the two windings and any suitable source of alternating current, as from an oscillator, may be supplied to these windings. The primary windings could, if desired, be connected in parallel with provision for correcting any phase difference encountered. The secondary rotor coils 2 and 4 are connected in series with each other and with a bridge 5. This bridge is preferably a Wheatstone bridge whose arms containing suitable condition responsive pickup elements of any desired electrical impedance type 6 which, preferably for torquemeter applications, are bonded wire type strain gages secured to the shaft at 45 degrees to its axis so as to be responsive to torsional strains. By employing the gages in all four arms we are able to effect adequate temperature compensation and obtain very accurate results as well as secure increased sensitivity, all as well understood in torquemeter applications. The output of the bridge is connected to undivided output or signal windings 7 and 8, winding 8 being wound upon shaft S as a rotor and the winding 7 being the surrounding stator winding. The winding 7 would be connected to any usual and well-known instrumentation for measuring changes in resistance, or other impedance changes, in the bridge 5.

The windings 1, 2, 3 and 4 are located along the shaft, preferably in opposite directions from the output windings 7 and 8, and for simplicity they will be considered at an equal distance from the output windings. It will also be considered that all of the windings are identical in every respect. The polarity of the divided primary input windings 1 and 3 is subtractive and because they are supplied with the same amount of power from a common source of alternating voltage the magnetic fields created by these divided windings and induced in the shaft are in equal opposition.

The secondaries 2 and 4 of the divided input windings are electrically connected in series as shown so that the induced secondary voltages therein are additive rather than in opposition, thereby permitting development of sufficient voltage to excite the bridge. As a result of the opposing magnetic arrangement of the divided primary portions of the input windings there is some point between these divided portions at which the magnetic fields created by them will be equal in intensity but 180 degrees out of phase.

Assuming perfect symmetry of winding construction and of the shaft, the point of equal intensity will fall at the mid point between the two outside power input windings. If the signal output windings 7 and 8 are placed at this neutralized point, the voltages induced in the signal windings by the magnetic field from the power input windings will be equal and opposite and the net effect on the output of winding 7 will be zero or substantially so whenever there is no torque on the shaft.

Broadly, it may be considered that one-half of the signal coils 7 and 8 is subjected to the magnetic field from coil 3 and the other half to the field from coil 1. Hence, the voltage generated in the two halves of the signal coils will be equal and opposite and wholly self-contained and balanced out within the signal coils themselves, whereby the only output voltage from the signal coils will be the result of bridge unbalance.

In operation, alternating current is supplied to the divided primary coils 1 and 3 whose transformer action induces a voltage in the divided secondary coils 2 and 4. These divided coils constitute, in effect, a single pair of inductively associated windings. However, the division of these windings into two parts permits the same to be what might be termed a self-contained or inherent means in the power circuit for creating a location along the shaft in which the intensity of the magnetic fields from the divided windings are equal and opposite. The signal coils 7 and 8 by being positioned in this location will allow only unbalanced voltages of bridge 5 to be transmitted through the signal windings 7 and 8. As a result of this extremely simple yet highly effective neutralizing action of the adverse magnetic effects in the system, we are able to obtain a true null balance having a single zero common to either direction of strain, and also obtain a larger range of linearity between a given change of strain and the signal voltage in response to such strain. At the same time we secure maximum power transfer efficiency together with the ability to bring the input windings reasonably close together for compactness.

While the arrangement shown in Fig. 1 has magnetic and mechanical symmetry, it should be pointed out that in its broader aspects it also has electrical symmetry. If this electrical symmetry is maintained it is possible to have the divided windings 1, 2 and 3, 4 placed in an unsymmetrical position about the signal windings 7, 8. For instance, as shown in Fig. 1, the coils 1 and 2 may be positioned at the dotted line 9 and coils 3 and 4 at line 10. Electrical symmetry will not be present in this arrangement unless the net induced voltage in windings 7, 8 is substantially zero. This is obtained by proper adjustment of the relative power input to coils 1 and 3 by employing either a resistance 9' or capacitance 10', or both. These allow the power input to be divided between the coils 1, 2 and 3, 4 in such proportion as will insure equal and opposite field intensity at the signal windings.

In cases where local circuit conditions result in magnetic fields which are not exactly 180 degrees out of phase, the 180 degree condition can be achieved by also employing the reactive components, such as for example as 9' and 10', across one of the primaries 1 or 3.

It will of course be understood that in practical designs, it is desirable to have the magnetic fluxes at as low a level as possible during neutralization of each other in the signal coils 7 and 8. Consistent with the actual conditions under which the apparatus must be installed, this low level is facilitated by using as much spacing as possible between the three windings along the shaft, and also by providing usual magnetic shielding about the various coils which improves the transformer efficiency of each and reduces the amount of stray flux.

Figure 2:
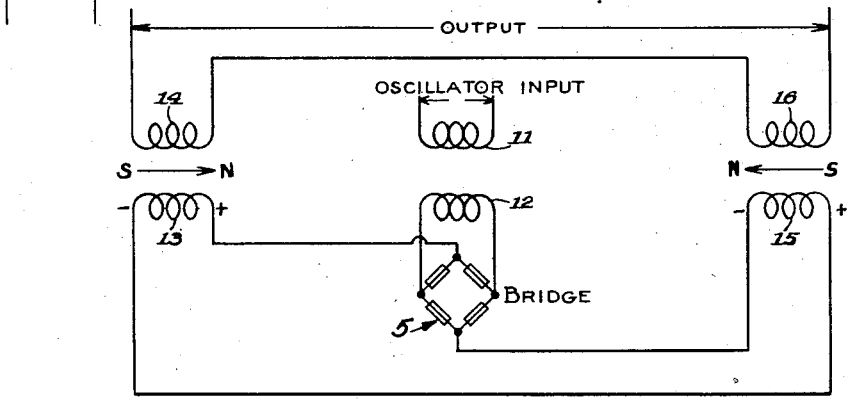
Fig. 2 is a wiring diagram in which an undivided pair of input windings is used with divided output windings.

In the arrangement shown in Fig. 2, the power input to the bridge may be through a pair of undivided windings comprising a single primary coil 11 and a single secondary 12 whereas a pair of output windings are divided as indicated at 13, 14, 15 and 16. This arrangement embodies all the fundamental principles described herein and hence further explanation is not necessary. It is to be noted particularly that the principle is present of having the signal windings subjected to power input fields of equal intensity but opposite polarity. This is the same as in Fig. 1. In the practical case, however, the arrangement of Fig. 1 is preferable to that of Fig. 2 in that the level of magnetic flux in the region of the signal coils 7 and 8 will be in general lower for a given power input and spacing of winding than the flux around signal coils 13, 14, 15 and 16 in Fig. 2.

In the arrangement of Fig. 4, the input windings are divided as at 30 and 31 and also the signal or output windings are divided as at 32 and 33. These divided portions of the respective windings are connected in series and, as shown, the signal coils may be placed equal distances from the power input coils thereby subjecting the signal coils to identical field intensities. Inasmuch as the fields from the power input coils are of opposite polarity, it is seen that bucking voltages will be set up but they will be contained entirely within the signal coils so that the only actual output will be in response to impedance changes in the pickup bridge. This arrangement has all of the advantages of electrical symmetry with the results of true null balance, power efficiency and others. It also has the particular advantage of allowing the respective divided windings to be placed at widely spaced points along a shaft. For instance, if the shaft passes through a large housing, such as a steam turbine, or through a large journal bearing, one set of the divided portions of the windings could be placed around the shaft at one end of the housing and the other set of divided windings could be placed around the shaft at the other end of the housing, and similarly for whatever other obstruction might be present.

In the arrangement of Fig. 5, provision is made for rebalancing the bridge in the event that some drift unbalance occurs over the life of the torquemeter or other equipment. To re-establish a desired zero position of the bridge 35, I have connected two arms of the bridge 35 in series with two transformer primaries 36 and 37. These primaries are wound concentric with the shaft similar to the oscillator input and signal coil sets. Secondary coils 38 and 39 are also provided concentric to the shaft and are connected through a potentiometer 40. The net result of this system is the reflection of a pure resistance from the potentiometer circuit connected to the stator windings 38 and 39 to the bridge arms connected to the rotor windings 36 and 37, thereby allowing variation in bridge balance to be easily achieved. In this connection it should be noted that any capacitive or phase unbalance in the bridge can also be compensated for by reducing the necessary reactance 41 in the potentiometer circuit. The balancing transformer coils 36—39 may be placed either inside or outside the oscillator input coils with equally satisfactory results, assuming that they are spaced equal distances from the input coils so as to be subject to same field intensity strength therefrom. A further result of this potentiometer operation is that usual restoring servo-motors may be connected to the adjustable contact of the potentiometer. The voltage from the signal coil 42 would be imposed on the servo-motor through any usual amplifiers and thereby drive the motor until the potentiometer is adjusted to a null position. Thus, the indicator point usually associated with such restoring servo-motors would assume a position on a suitable dial as a direct function of the bridge unbalance, the motor driven potentiometer serving to rebalance the bridge irrespective of the original degree of unbalance. Broadly, however, it is seen in this balancing arrangement that the bridge is balanced by reflecting pure resistance or reactive components through inductive means such as the rotary transformer incorporated in the torquemeter design and this is applicable regardless of whether the bridge balancing is used only for rebalancing the bridge to re-establish a predetermined zero or is used in a follow-up servo-motor operation for indicating purposes. The power coils in this arrangement are indicated at 43 and 44.

In the arrangement of Fig. 6, instead of employing a self-generated voltage in the balancing circuit as shown in Fig. 5 we supply power from a common external power oscillator to both the balancing circuit and the input windings 43' and 44' and relatively adjust the power between two sets of balancing coils 38' and 39' by a series of three coaxially arranged coils 50, 51, 51 connected as shown and through which an armature core 54 extends. Power is supplied to the center coil 50, and the two coils 51 are connected to the balancing transformer coils 46 and 47 as shown. By shifting the core 54 the current can be increased in one of the coils 51 and decreased in the other depending upon the direction in which it is necessary to re-establish proper balance of the bridge. The output coils are shown at 42'. A variable capacitor 55 is for adjusting the phase of the balancing coil voltage so that it is 180 degrees out of phase with the balancing transformer coils 38' and 39'. In both Figs. 5 and 6 it is helpful to have the balancing transformer coils 36—39 and 36'—39' arranged so that their fields oppose the input fields of 43, 44 and 43', 44'. The strength of the balancing fields is very much smaller than that of the input fields and hence the latter are only partially opposed by the balancing fields. However, whatever opposition is present will allow the input coils to be brought that much closer together.

From the foregoing disclosure, it is seen that we have provided a simple and yet very effective system for transmitting conditions to be measured or controlled from a rotating shaft to an external point or vice versa, if desired. The system may, of course, be used as previously indicated for any desired condition especially where bonded wire type strain gages are employed as then it is possible to easily measure shear, shaft acceleration, shaft bending, etc. as is pointed out in various patents including Ruge Patent No. 2,392,293.

It will of course be understood that various changes in details of construction and arrangement of parts may be made by those skilled in the art without departing from the spirit of the invention as set forth in the appended claims.

We claim:

1. An electrical system comprising a set of inductively associated power input windings, a set of inductively associated output windings, a rotating shaft, certain of the input windings and of the output windings being mounted on said shaft for rotation therewith, condition responsive impedance means, also mounted on said shaft for rotation therewith and electrically connected to the windings of each set that are mounted on the shaft whereby power is supplied to said impedance means and an output voltage is transmitted therefrom in response to a change of condition, one of said sets of windings being divided and arranged so that their polarity opposes each other, and the windings of the other of said sets being so disposed with respect to said divided windings that the input flux is substantially incapable of inducing an output voltage in the output windings, whereby a change in imepdance in response to a change of condition is the essential source of output voltage.

2. The combination set forth in claim 1 further characterized in that the divided windings are connected in series with each other.

3. The combination set forth in claim 1 further characterized in that the divided windings are located outside of the other windings.

4. The combination set forth in claim 1 further characterized in that the divided windings constitute the power input side of the system and the output windings are located where the magnetic fields of the divided windings have substantially equal intensities.

5. The combination set forth in claim 1 further characterized in that the divided windings constitute the power input side of the system and the output windings are undivided.

6. The combination set forth in claim 1 further characterized in that the input windings are undivided and the divided windings constitute the output side of the system.

7. The combination set forth in claim 1 further characterized in that the input and output windings have stator and rotor coils, the rotor coils being secured to a rotatable member for rotation therewith, and the condition responsive impedance means being rotatable with said member.

8. The combination set forth in claim 1 further characterized in that the output windings are located with respect to the input windings so as to be subjected simultaneously to fields of opposing polarity whereby opposing voltages are set up within the output windings but are substantially wholly self-contained therein so that there is substantially zero output voltage insofar as the input fields can generate a voltage in the output windings.

9. An electrical system comprising two pairs of inductively associated input windings and a third pair of inductively associated output windings, an electrical circuit which includes one winding of each of the above pair of windings, a rotatable shaft, certain of the input windings and of the output windings being mounted on said shaft for rotation therewith, the two pairs of input windings being so arranged magnetically and electrically as to mutually neutralize the effect of their magnetic fields in the vicinity of the pair of output windings, and said electrical circuit including condition responsive impedance means mounted on said shaft for rotation therewith whereby an output voltage arises substantially solely from a change in condition.

10. An electrical system comprising a power input circuit having magnetically coupled windings and an output circuit having magnetically coupled windings, a rotatable shaft, certain of the input windings and of the output windings being mounted on said shaft for rotation therewith, condition responsive impedance means mounted on said shaft for rotation therewith and electrically connected to the two circuits, and the windings of one of said circuits being divided and so disposed with respect to the windings of the other circuit that the magnetic effect of the input circuit will be neutralized in its relation to the output windings thereby allowing the output circuit to be responsive substantially solely to the voltage produced by a change in the impedance means.

11. In combination, a rotating member having a condition responsive bridge rotatable therewith, inductively associated windings through which power is supplied to the bridge, inductively associated windings for transmitting a signal voltage from the bridge to a point externally of the rotating member, and means for adjusting the output signal voltage of the bridge to a desired level and for restoring that level after bridge conditions have changed.

12. In combination, a rotating member having a condition responsive bridge rotatable therewith, inductively associated power input windings having primary and secondary coils through which power is supplied to said bridge, inductively associated signal output windings having primary and secondary coils for transmitting a signal voltage from the bridge to a point externally of the rotating member, means for adjusting the output signal voltage of the bridge to a desired level and for restoring that level after bridge conditions have changed, said adjusting means comprising two pairs of inductively associated rotor and stator windings for the rotating member and a pair of coaxial secondary windings having an intermediate coaxial primary winding, said rotor windings being connected in adjacent arms of the bridge and the stator windings being connected with the coaxial secondary windings, and a core for said coaxial windings adapted upon movement to adjust the balance of the bridge through the rotor and stator windings.

GERARD Q. DECKER, 3RD.
EDMUND C. CAPUZZI.

REFERENCES CITED

The following references are of record in the file of this patent:

Alternating Current Bridge Methods, Hague Pitman Pub. Corp. 1938.